United States Patent
Griffin et al.

(10) Patent No.: US 12,154,106 B1
(45) Date of Patent: Nov. 26, 2024

(54) ENCAPSULATION OF PAYMENT INFORMATION

(71) Applicant: Wells Fargo Bank, N.A., San Francisco, CA (US)

(72) Inventors: Phillip H. Griffin, Raleigh, NC (US); Ashia Kennon, Aston, PA (US); Catherine Wangari Mwangi, Hackensack, NJ (US); Jal Daruwalla, Chatham, NJ (US); Joanne Strobel-Cort, Summit, NJ (US); Lynnel J. Kresse, Ruskin, FL (US); Michael Knorr, Fairfield, CT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 94 days.

(21) Appl. No.: 17/833,760

(22) Filed: Jun. 6, 2022

Related U.S. Application Data

(62) Division of application No. 15/963,652, filed on Apr. 26, 2018, now Pat. No. 11,354,660.

(60) Provisional application No. 62/491,076, filed on Apr. 27, 2017.

(51) Int. Cl.
    *G06Q 20/38* (2012.01)
    *G06F 21/62* (2013.01)

(52) U.S. Cl.
    CPC ..... *G06Q 20/3829* (2013.01); *G06F 21/6245* (2013.01); *G06Q 20/3825* (2013.01); *G06Q 20/3827* (2013.01)

(58) Field of Classification Search
    None
    See application file for complete search history.

(56) References Cited

U.S. PATENT DOCUMENTS

| | | | |
|---|---|---|---|
| 4,578,530 | A | 3/1986 | Zeidler |
| 5,610,982 | A | 3/1997 | Micali |
| 5,825,880 | A | 10/1998 | Sudia et al. |
| 5,995,625 | A | 11/1999 | Sudia et al. |

(Continued)

OTHER PUBLICATIONS

"Information technology—Security techniques—Signcryption", International Standard ISO/IEC 29150. First Edition, Dec. 15, 2011. 60 pgs. (Year: 2011).*

(Continued)

*Primary Examiner* — Jamie R Kucab
(74) *Attorney, Agent, or Firm* — Foley & Lardner LLP

(57) ABSTRACT

A method including receiving a signcrypted cross-border payment message, the signcrypted cross-border payment message generated by signcrypting a cross-border payment message using a first financial institution public key, a first financial institution private key, and a second financial institution public key, retrieving the first financial institution public key, the second financial institution public key, and a second financial institution private key, wherein the second financial institution public key and the second financial institution private key are part of a public/private key pair, unsigncrypting the signcrypted cross-border payment message using the first financial institution public key, the second financial institution public key, and the second financial institution private key to retrieve the cross-border payment message, and verifying that the first financial institution public key is associated with a first financial institution.

11 Claims, 5 Drawing Sheets

(56) References Cited

U.S. PATENT DOCUMENTS

| | | | |
|---|---|---|---|
| 6,144,739 | A | 11/2000 | Witt et al. |
| 6,560,581 | B1 | 5/2003 | Fox et al. |
| 7,113,594 | B2 | 9/2006 | Boneh et al. |
| 7,162,635 | B2 | 1/2007 | Bisbee et al. |
| 8,200,760 | B2 | 6/2012 | Jacobs |
| 8,316,237 | B1 | 11/2012 | Felsher et al. |
| 8,447,036 | B2 | 5/2013 | Jho et al. |
| 8,448,719 | B2 | 5/2013 | Furukawa |
| 8,572,682 | B2 | 10/2013 | Karabulut |
| 8,818,903 | B2 | 8/2014 | Dulin et al. |
| 8,892,475 | B2 | 11/2014 | Tallent et al. |
| 9,401,811 | B2 | 7/2016 | Asim et al. |
| 10,461,943 | B1 * | 10/2019 | Norum ............... H04L 63/0823 |
| 2002/0073311 | A1 | 6/2002 | Futamura et al. |
| 2002/0091922 | A1 | 7/2002 | Shrader et al. |
| 2004/0158708 | A1 | 8/2004 | Peyravian et al. |
| 2007/0201512 | A1 | 8/2007 | Mills et al. |
| 2007/0214363 | A1 | 9/2007 | Ishii |
| 2008/0065895 | A1 | 3/2008 | Liu et al. |
| 2009/0097657 | A1 | 4/2009 | Scheidt et al. |
| 2014/0169556 | A1 * | 6/2014 | Yagisawa ............. H04L 9/0816 380/30 |
| 2016/0203496 | A1 | 7/2016 | Guerrero et al. |
| 2016/0330027 | A1 | 11/2016 | Ebrahimi |
| 2017/0237554 | A1 | 8/2017 | Jacobs et al. |
| 2017/0289137 | A1 * | 10/2017 | Pendarakis ......... H04L 63/0823 |
| 2018/0083786 | A1 | 3/2018 | Dierks et al. |
| 2020/0045552 | A1 * | 2/2020 | Kim .................... H04W 12/069 |

OTHER PUBLICATIONS

CryptoSys PKI "CMS Signed Data objects", p. 1, The Wayback Machine—https://web.archive.org/web/20100905202050/http://www.cryptosys.net:80/pki/manpki/pki_signeddata.html (Year: 2010).

Narendiran et al., "Public Key Infrastructure for Mobile Banking Security", Global Mobile Congress, 2009. https://www.infona.pl/resource/bwmeta1.element.ieee-art-000005295898. 2 pages.

Navok, https://www.developer.com/java/ent/article.php/3092771/how-digital-signatures-work-digitally-signing-messages.htm, Oct. 16, 2003 (Year: 2003).

Smart Card Alliance Payments Council, "Technologies for Payment Fraud Prevention: EMV, Encryption and Tokenization", Publication Date Oct. 2014. 34 pages.

* cited by examiner

ENCAPSULATION OF PAYMENT INFORMATION

CROSS-REFERENCE TO RELATED PATENT APPLICATIONS

This application is a divisional of pending U.S. application Ser. No. 15/963,652, entitled "Encapsulation of Payment Information," filed Apr. 26, 2018, which claims the benefit of priority to U.S. Provisional Application No. 62/491,076, entitled "Encapsulation of Payment Information," filed Apr. 27, 2017, all of which are incorporated herein by reference in their entirety.

BACKGROUND

With the rise of globalization, the number of international financial transactions is enormous. These transactions, occurring between multiple parties in multiple countries, are often referred to as "cross-border" payments (e.g., international funds transfer). A cross-border payment involves a payment (e.g., transfer) from an originator to a beneficiary. As understood in the field, the originator is the payor (e.g., the person or entity paying funds) and the beneficiary is the payee (e.g., the person or entity receiving funds). The cross-border payment request is received by the originator's bank (referred to as the "originating financial institution") and is ultimately received by the beneficiary's bank (referred to as the "receiving financial institution"). The path of the funds from the originating financial institution to the receiving financial institution may go through one or more "intermediate" financial institutions, such as correspondent banks. Cross-border payments are susceptible to failure (in part due to differing financial requirements and regulations associated with different countries), fraud, or accidental error along the chain from the originating financial institution to the receiving financial institution. Current systems are not capable of tracking funds and providing full end-to-end authentication for cross-border payments. Instead, current systems provide point-to-point (e.g., bank-to-bank) authentication, which does not provide full transparency or authentication details to intermediate financial institutions along the chain.

Digital signatures are mathematical schemes for demonstrating the data integrity and origin authenticity of digital messages or electronic documents. A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient establish the shared key in a secure manner. Public key (asymmetric) cryptographic systems may also be used to exchange messages securely. With public-key cryptographic systems, two types of keys are used-public keys and private keys. A sender of a message to a recipient (e.g., transmitting bank along the chain of a cross-border payment) may encrypt the message using the public key of a recipient. The recipient may use a corresponding private key to decrypt the message.

Additionally, public key cryptographic systems (e.g., asymmetric key cryptographic systems) may be used to produce digital signatures. A recipient of a message that has been digitally signed can use the digital signature to verify the identity of the message sender and confirm that the message has not been altered during transit. In a typical digital signature arrangement, a sender uses a cryptographic hash function to produce a hash (e.g., message digest); the hash is much smaller than the original message and is relatively unique to the message. The sender then uses its private key to generate the digital signature on the hash. The process of generating the digital signature (signing the message) uses a mathematical operation that can only be performed by the sender who possesses the private key. The message and the digital signature can then be sent to a recipient. As will be appreciated, the recipient (e.g., receiving bank along the chain of a cross-border payment) is an entity that can use the digital signature and the message sender's public key (e.g., encapsulated in a certificate) to determine that the sender is the message signer (to verify origin authenticity) and that the message has not been compromised (to verify data integrity).

Signcryption is a hybrid cryptographic primitive that utilizes an asymmetric encryption scheme and a digital signature scheme combined in a specific way, along with specially developed algorithms to perform both encryption and digital signature functions simultaneously. This efficient cryptographic technique provides data integrity, origin authentication, and data confidentiality in a single operation. Some versions of signcryption algorithms provide non-repudiation. By utilizing signcryption, a signcrypted cross-border payment message protects the confidentiality and data integrity of the signcrypting party's content during transfer and storage. The end-to-end cross-border payment authentication system and digitally signed cross-border payment message allows a recipient financial institution to validate the information and decrypt the content in the digitally signed cross-border payment message.

As cross-border payments occur more frequently and travel through more intermediate financial institutions, there is a growing need for data assurance, integrity, and verification throughout the chain of a cross-border payment from originating financial institution to the receiving financial institution. The protection and maintenance of sensitive information needs to be efficient and effective, providing assurance and authentication of the cross-border payment without compromising any sensitive information or slowing down information exchange processes with heavy (e.g., processor-intensive) protection mechanisms.

SUMMARY

Various embodiments relate to a method performed by a processor of a computing system. An example embodiment relates to a method performed by a processor of a computing system. An example method includes receiving a signcrypted cross-border payment message. The signcrypted cross-border payment message is generated by signcrypting a cross-border payment message using a first financial institution public key, a first financial institution private key, and a second financial institution public key, wherein the first financial institution public key and the first financial institution private key are part of a public/private key pair. The first financial institution public key, the second financial institution public key, and a second financial institution private key are retrieved. The second financial institution public key and the second financial institution private key are part of a public/private key pair. The signcrypted cross-border payment message is unsigncrytped using the first financial institution public key, the second financial institution public key, and the second financial institution private key to retrieve the cross-border payment message. Authenticity and data integrity of the signcrypted cross-border payment message can be determined by successfully unsigncrypting using the first financial institution public key, the second financial institution public key, and the second financial institution private key. The first financial institution public key is verified to confirm it is associated with a first financial institution.

These and other features, together with the organization and manner of operation thereof, will become apparent from the following detailed description when taken in conjunction with the accompanying drawings, wherein like elements have like numerals throughout the several drawings described below.

Figure 1:
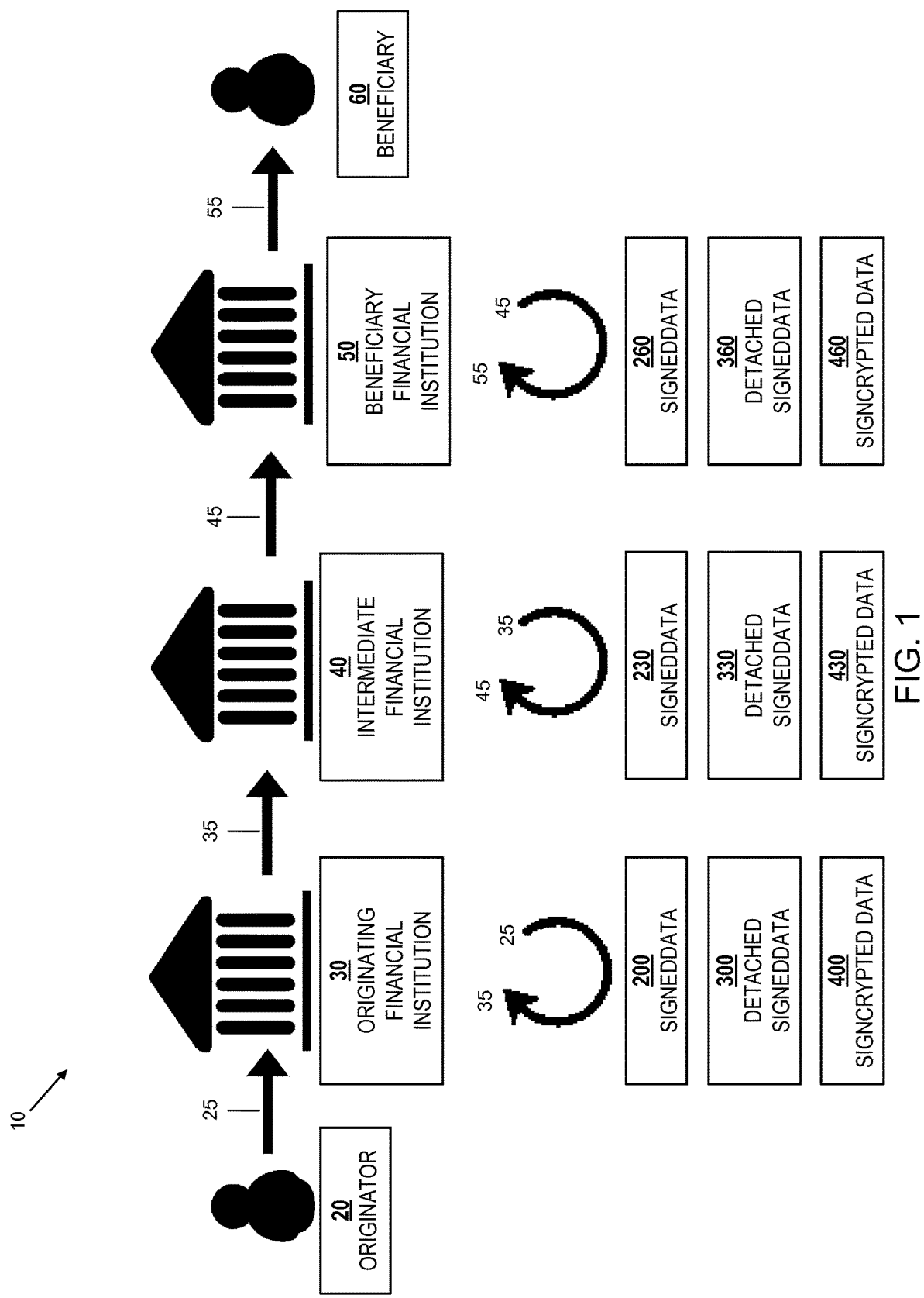
FIG. 1 is a functional block diagram of an end-to-end cross-border payment authentication system, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

There are several risks—to the financial institutions along the chain, to the originator, and to the beneficiary—that arise from the lack of full end-to-end authentication, which may be accidental or malicious. Since the processing of a cross-border payment is done based on specific bank names and bank identifiers, for example under an object identifier ("OID"), alteration of one of the OIDs can improperly route, delay or halt a cross-border payment with little to no evidence of when or where along the chain the alteration of the identifier occurred.

Various embodiments described herein relate to systems and methods for an end-to-end cross-border payment authentication system. Generally, the end-to-end cross-border payment authentication system allows for cross-border payment information to be authenticated by each party (e.g., financial institution) in a cross-border payment chain, signed by the respective parties, and published to a shared repository. This end-to-end cross-border payment authentication system provides data integrity and origin authenticity for a payment through each step of the cross-border payment chain. As will be appreciated, cross-border payment information data can be verified at any point in the cross-border payment chain and provides a record of where the data was compromised or changed, thereby enabling the detection of the problem point. In the event of a problem with a cross-border payment, an entity could use the instant concept to look backwards through each step in a payment to identify the point at which the cross-border payment chain was compromised.

The end-to-end cross-border payment authentication system is structured so each successive step in the cross-border payment chain wraps another digital signature around the previous cross-border payment message (e.g., identifiers and data of the cross-border payment). Various aspects utilize SignedData, detached SignedData, and SigncryptedData message schema, each of which provides unique functionality. Generally, the digital signature process is also referred to as "signing a message digest." The message digest includes hash values that represent the specific, digitally signed cross-border payment messages in the end-to-end cross-border payment authentication system. A message digest is assigned to particular data content such that a change to any of the content within a cross-border payment message will be reflected in the message digest. In some arrangements, the message digest includes a direct signature that does not first hash the information to be protected before signing the content. In some arrangements, a signature key that includes a set of private data elements specific to an entity and usable only by this entity in the signature process may be used for the digital signature process.

Referring generally to the use of the SignedData schema, a SignedData message is generated at each step in the cross-border payment chain. Each successive step in the payment chain wraps another SignedData message around the previous message, and additional attributes can be added to the SignedData messages at each step. Using the detached SignedData schema, a hash of the cross-border payment message is signed at each step in the payment chain and is transmitted out-of-band. As will be appreciated, the actual payment message content is not present, which maintains confidentiality throughout the process. With SignedData or detached SignedData, each financial institution can perform recursive descent at each step in the cross-border payment chain to validate the integrity of the cross-border payment message at each step.

Alternatively, using the SigncryptedData message schema eliminates the need to perform recursive descent. At each step, a financial institution takes the receiving financial institution's public key and the sending financial institution's public and private keys and signs and encrypts the cross-border payment message with all three keys. The receiving financial institution can use the receiving financial institution's public and private keys and the sending financial institution's public key to unsigncrypt the cross-border payment SigncryptedData message. To move the cross-border payment message to the next financial institution, the receiving financial institution can generate a new SigncryptedData message using the receiving financial institution's public and private key and the next recipient financial institution's public key. The SigncryptedData message includes the ordinary data of the payment message and can include as an attribute in the new SigncryptedData message the received (and unsigncrypted) SigncryptedData message from the sending financial institution. While recursion is no longer needed, only the receiving financial institution at each point can unsigncrypt the SigncryptedData message and recover the message. While this is more limiting than the use of SignedData messages—due to requiring participation of all members in the chain—the SigncryptedData message provides enhanced confidentiality to the cross-border payment process by way of encryption. In some embodiments, the one or more signcrypters to access a symmetric key signcrypted with two asymmetric key pairs. In other words, the data is encrypted with a symmetric key and subsequently the key is signcrypted to create a series of signcrypted envelopes, one for each recipient along the path to the final recipient; each envelope would be signcrypted using the public key of that recipient.

In another embodiment, each public/private key pair is selected such that a message encrypted with one of the keys can only be decrypted with the other key in the key pair. In general, a public key is made public (i.e., generally accessible and available to the public), while a private key is kept private to just the owner of the public/private key pair. Among other things, public/private key pairs may be used to "digitally sign" content. As such, the party's digital signature can subsequently be verified by a third party using a signature verifying algorithm with the message, the public key for the party, which the third party retrieves from the party's digital certificate, and the digital signature. For example, a first party could initiate the process by signing a SignedData message using SignerInfo(0) and sending it to a second party. The second party creates a signerinfo attribute that contains as a ayload the SignerInfo(0) value. The second party signs the payload along with the messageDigest and contentType attributes using SignerInfo(1). The second party sends the signed message along to a third party that creates a signerInfo attribute containing as its payload the SignerInfo(1) value. The third party signs the payload along with the messageDigest and contentType attributes using SignerInfo(2). This process is repeated for each subsequent party in the message chain.

As will be appreciated, the end-to-end cross-border payment authentication system may be used to digitally sign and verify digital signatures in connection with secure communications, funds transfers, e-commerce transactions or other types of cross-border payments, such as those involving, for example, cloud-based, blockchain-based, distributed ledgers, or smart contract systems. Beneficially, the digital signature may be types of keys used to perform a key agreement scheme, such as Diffie-Hellman or elliptic curve Menezes-Qu-Vanstone ("ECMQV"). In those embodiments, participants would use their public/private keys to derive a share secret symmetric key to encrypt the payload.

The end-to-end cross-border payment authentication system provides technical solutions to computer-centric and internet-centric problems associated with conventional message systems. By having the cross-border payment information encapsulated in each financial institution's digital signature, a compromised financial institution could alter only the cross-border payment information encapsulated in that specific financial institution's digital signature and not a previous financial institution's digital signature. Accordingly, forensic analysis on a cross-border payment along the cross-border payment chain would ascertain when and by whom the cross-border payment message was altered. Through digital signature verification and path validation, the end-to-end cross-border payment authentication system provides a simple, yet effective, mechanism for protecting and monitoring a cross-border payment throughout a cross-border payment chain.

Further, the methods and systems described herein alleviate the strain on processing power and memory components currently required to manage, store, and authenticate the biometric sample of a message signer. The end-to-end cross-border payment authentication system provides a way through SigncryptedDate for secure applications in a single cryptographic function to integrate encryption and signature schemes efficiently without sacrificing each scheme's security. In some embodiments, the end-to-end cross-border payment authentication system utilizes a signed attributes feature to provide for an easy and lightweight mechanism to bind additional information to the cross-border payment message. The end-to-end cross-border payment authentication system's use of additional attributes avoids complicating certificate issuance and management of processes by allowing the signcrypting party to add information regarding certificate extension payload as a signed attribute. The ability to add attributes of any kind or any format makes the end-to-end cross-border payment authentication system a very flexible mechanism for effectuating a cross-border payment. Accordingly, the end-to-end cross-border payment authentication system can be easily adapted to support new financial institution applications and security requirements. Additionally, making use of a time stamp token ("TST") from a time stamp authority ("TSA") enables a relying party to determine when a cross-border payment message was digitally signed and that it is "fresh" (e.g., that the sample is not from an unauthorized party along the cross-border payment chain).

These problems arise out of the use of computers and the internet because each problem involves processing power, bandwidth requirements, storage requirements, and information security, each of which is inherent to the use of computers and the Internet. The problems also arise out of the use of computers and the internet, because online communications, transactions, and payment services and the ability to properly authenticate a signcrypting party in an online communication cannot exist without the use of computers and the Internet.

Referring to FIG. 1, a functional block diagram of an end-to-end cross-border payment authentication system 10 is illustrated, according to an example embodiment. The end-to-end cross-border payment authentication system 10 is used to generate an end-to-end cross-border payment authentication chain (hereinafter referred to as a "cross-border payment chain") by digitally signing a cross-border payment message at each financial institution along the cross-border payment chain. By wrapping the cross-border payment message in a digital signature, the data integrity and origin authenticity of the cross-border payment can be evaluated at each step along the cross-border payment chain. As shown in FIG. 1, the end-to-end cross-border payment authentication system 10 includes a cross-border payment chain that includes an originator 20, an originating financial institution 30, an intermediate financial institution 40, a beneficiary financial institution 50, and a beneficiary 60. The end-to-end cross-border payment authentication system 10 is used to digitally sign a cross-border payment message 35, 45 at various stages throughout the cross-border payment chain. As will be appreciated, each of the originating financial institution 30, the intermediate financial institution 40, and the beneficiary financial institution 50 undergoes a digital signature process (e.g., using SignedData, detached SignedData, or SigncryptedData). In some arrangements, the transport of the digitally signed cross-border payment message is facilitated using transport layer security ("TLS").

The process of using the end-to-end cross-border payment authentication system 10 begins when the originator 20 initiates a cross-border payment to the beneficiary 60. The originator 20 submits a cross-border payment request 25 with the originating financial institution 30. The originator 20 has an account at the originating financial institution 30. The cross-border payment request 25 includes details regarding the originator's account that will be used to facilitate the cross-border payment, the beneficiary account details, the beneficiary 60 name, and any other details needed for the cross-border payment. The originating financial institution 30 then begins the cross-border payment chain by preparing a cross-border payment message that includes the details provided by the originator 20. The originating financial institution 30 generates a first digitally signed cross-border payment message 35 by digitally signing the cross-border payment message. The originating financial institution 30 may digitally sign the first digitally signed cross-border payment message 35 using a SignedData method 200, a detached SignedData method 300, or a SigncryptedData method 400. The digitally signature process is described in greater detail below in regard to the SignedData method 200, the detached SignedData method 300, and the SigncryptedData method 400 in FIG. 2, FIG. 3, and FIG. 4, respectively.

The originating financial institution 30 transmits the first digitally signed cross-border payment message 35 to the intermediate financial institution 40. The intermediate financial institution 40 first verifies the digital signature of the received first digitally signed cross-border payment message 35. Once verified, the intermediate financial institution 40 encapsulates the first digitally signed cross-border payment message 35 with the digital signature of the intermediate financial institution 40 to generate the second digitally signed cross-border payment message 45. The verification and digital signature process of the intermediate financial institution 40 is described in greater detail below in regard to the SignedData method 230, the detached SignedData method 330, and the Signcrypted Data method 430 in FIG. 2, FIG. 3, and FIG. 4, respectively.

The intermediate financial institution 40 transmits the second digitally signed cross-border payment message 45 to the beneficiary financial institution 50. The beneficiary financial institution 50 verifies the digital signature of the received second digitally signed cross-border payment message 45. The verification of the digital signature by the beneficiary financial institution 50 can be a similar process to the verification process by the intermediate financial institution 40. The verification process of the beneficiary financial institution 50 is described in greater detail below in regard to the SignedData method 260, the detached SignedData method 360, and the SigncryptedData method 460 in FIG. 2, FIG. 3, and FIG. 4, respectively. Once verified, the beneficiary financial institution 50 transmits a cross-border payment 55 into the account of the beneficiary 60. As will be appreciated, more than one intermediate financial institutions may be along the cross-border payment chain from the originating financial institution 30 to the beneficiary financial institution 50. The verification and digital signing by the additional intermediate financial institutions may be similar to the methods 260, 360, 460 used by the intermediate financial institution 40 shown in FIG. 1 and described in greater detail below in FIG. 2-4.

As will be appreciated the end-to-end cross-border payment authentication system 10 can be used to combat, spot, and trace fraudulent or accidental information changes throughout the cross-border payment chain. For example, in an instance where a specific financial institution along the cross-border payment chain becomes compromised and transactions are being fraudulently altered over a financial institution communication system (e.g., SWIFT), a subsequent financial institution could examine all of the digital signatures and information encapsulated in the received cross-border payment message and determine by what financial institution the information has been changed. By having the cross-border payment information encapsulated in each financial institution's digital signature, a compromised financial institution could alter only the cross-border payment information encapsulated in that specific financial institution's digital signature and not the previous financial institution's digital signature.

In some arrangements, a distributed or shared repository is a part of and utilized in the end-to-end cross-border payment authentication system 10. The distributed repository allows for formats, verification or signature information, detached content, or other information to be stored and accessible to all financial institutions in the end-to-end cross-border payment authentication system 10. In some arrangements, each action (e.g., receiving, verifying, digitally signing, transmitting, etc.) by a financial institution is logged and stored on the distributed repository. For example, the information can capture an event, a date, a timestamp, when the original cross-border payment request was made, the financial institutions along the cross-border payment chain, and the like. In some arrangements, fees or charges associated with the cross-border payment are stored and accessible through the distributed repository or as an added attribute in the digitally signed cross-border payment message. In other arrangements, the distributed repository allows for the use of self-executing contracts (e.g., "smart contracts") that can monitor the activity of a cross-border payment and execute when certain conditions are achieved.

Figure 2:
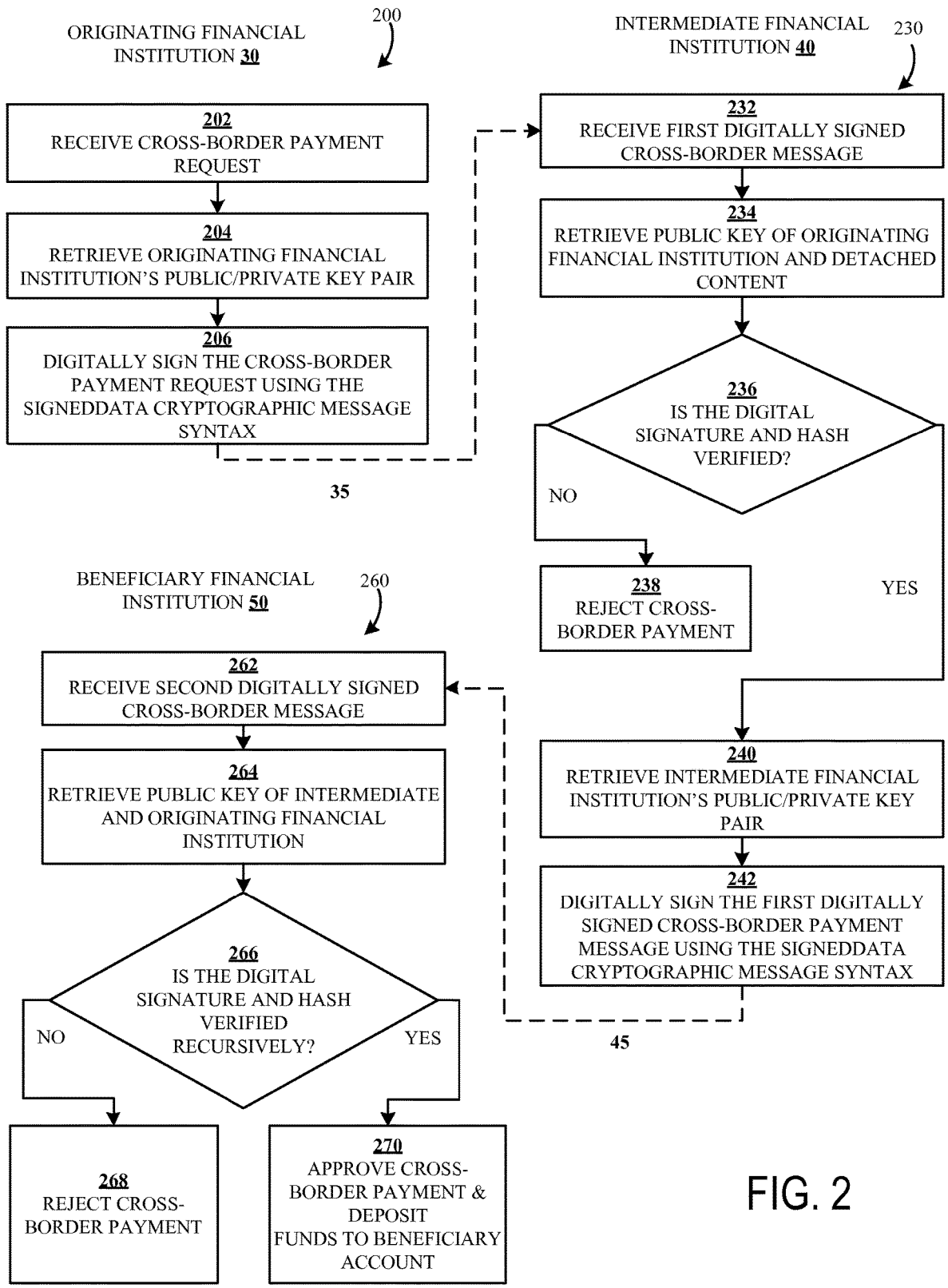
FIG. 2 is a flow diagram of a cross-border payment message using the SignedData schema and the end-to-end cross-border payment authentication system of FIG. 1, according to an example embodiment.

Referring to FIG. 2, a flow diagram of methods 200, 230, and 260 of digitally signing a cross-border payment message using a SignedData schema and the end-to-end cross-border payment authentication system of FIG. 1 is shown, according to an example embodiment. FIG. 2 is shown in connection with the end-to-end cross-border payment authentication system 10 of FIG. 1. The methods 200, 230, and 260, are shown in connection with the originating financial institution 30, the intermediate financial institution 40, and the beneficiary financial institution 50, respectively. In some arrangements, the methods, 200, 230, and 260, are performed by an external third party or by other systems and devices.

The originating financial institution's 30 generation of a SignedData message method 200 begins at 202 when the originating financial institution 30 receives a cross-border payment request 25 from an originator 20. The cross-border payment request 25 includes details regarding the originator's account that will be used to facilitate the cross-border payment, the beneficiary account details, the beneficiary name, and any other details needed for the cross-border payment.

At 204, the originating financial institution 30 retrieves a public/private key pair. In some arrangements, the public/private key pair is associated with a digital certificate in a public key infrastructure ("PKI"), for example the X.509 certificate. In those arrangements, a key pair is generated (the private/public key pair must be generated together because they are mathematically related), the private key signs the public key, and the public key of the pair is summited to the certificate authority ("CA") or the front end registration authority that will then generate that public key certificate. Generally, the public key is submitted to the CA and the CA verifies the identity of the key submitter and the CA digitally signs the information with the CA's private key. The certificate is also a confirmation or validation by the CA that the public key contained in the certificate belongs to the person, organization, server or other entity noted in the certificate. Alternatively, the retrieved private/public key pair can be one issued with a commercial CA, for example one associated with the originating financial institution 30.

At 206, the originating financial institution 30 digitally signs the cross-border payment request using the private key of the originating financial institution and the SignedData cryptographic message syntax to generate a first digitally signed cross-border payment message 35 (e.g., first Signed-Data message). The first SignedData message is generated by creating a cryptographic hash on the content-to-be-signed (e.g., the cross-border payment request 25) and any associated attributes carried in type SignedData. The hash is generated using a suitable cryptographic hash algorithm. A cryptographic hash algorithm or hash function is a one-way function that takes an arbitrary input string and generates a fixed-length output. The resulting output can be referred to as a hash, as hash value, or a message digest. Small changes to the input data result in large, unpredictable changes to the hash value. Accordingly, the hash of the cipher text can be used to verify. The originating financial institution 30, another financial institution on the cross-border payment chain, or the entity in charge of the end-to-end cross-border payment authentication system 10 may specify additional parameters or attributes. In some arrangements, the TST is included in "attributes" of the first SignedData message. A TST is generated by sending the hash to a TSA, which cryptographically binds the hash to a time stamp. In some arrangements, a Security Assertion Markup Language ("SAML") assertion is included in attributes of the first SignedData message. With SignedData, there is no need to send the actual certificate along in the message; instead an attribute or other identifier can indicate which certificate the subsequent financial institution needs to verify the signature. For example, an attribute could include "certificate issuer DN and certificate serial number 123" that uniquely identifies the signing certificate.

Step 206 is completed when the first digitally signed cross-border payment message 35 generated using the SignedData cryptographic message syntax is sent to the intermediate financial institution 40.

The intermediate financial institution's 40 method 230 of verifying and encapsulating the SignedData message begins at 232 when the intermediate financial institution 40 receives the first digitally signed cross-border payment message 35 from the originating financial institution 30.

At 234, the intermediate financial institution 40 retrieves the public key of the originating financial institution 30 to verify the digital signature of the first digitally signed cross-border message. In some arrangements, the key pair is associated with a digital certificate in a PKI or CA, allowing the intermediate financial institution 40 (or any other entity) to look up and retrieve the public key associated with originating financial institution 30. In other arrangements, the intermediate financial institution 40 could examine a public key component in the first digitally signed cross-border message to verify message 35 integrity but would be unable to get origin authenticity assurance.

At 236, the intermediate financial institution 40 verifies the digital signature of the originating financial institution 30 on the first digitally signed cross-border payment message 35. The verification process includes the intermediate financial institution's 40 generating a cryptographic hash of the content (e.g., cross-border payment details) identified in the first digitally signed message. The hash is signed using the public key of the originating financial institution 30, a signature algorithm, and any additional parameters. If the signature is valid, then the result will be the same as the value carried in the first digitally signed cross-border payment message 35 and the message is verified at 240. If signature fails, then the result will not be the same as the value carried in the first digitally signed cross-border payment message 35 and the message is not verified at 238. As will be appreciated, if the digital signature fails, then the intermediate financial institution 40 will be able to identify the originating financial institution 30 as a possible location on the cross-border payment chain where the cross-border payment message was altered, either accidently or fraudulently.

In some arrangements, the intermediate financial institution 40 verifies the TST included in the first digitally signed cross-border payment message 35 by completing a "hash check" of the information. The hash check includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key via digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA.

At 240, if the digital signature of the originating financial institution 30 is verified, the intermediate financial institution 40 retrieves a public/private key pair. In some arrangements, the public/private key pair is associated with a digital certificate in a PKI, for example the X.509 certificate. In those arrangements, a key pair is generated (the private/public key pair must be generated together as they are mathematically related), the private key signs the public key, and the pair is summited to the CA or the front end registration authority that will then generate a public key certificate. Alternatively, the retrieved private/public key pair can be one issued with a commercial CA, for example one associated with the intermediate financial institution 40.

At 242, the intermediate financial institution 40 digitally signs the first digitally signed cross-border payment message 35 using the private key of the intermediate financial institution 40 and the SignedData cryptographic message syntax to generate a second digitally signed cross-border payment message 45 (e.g., a second SignedData message that encapsulates the first digitally signed cross-border payment message 35). The second SignedData message is generated by creating a cryptographic hash on the content-to-be-signed (e.g., the first digitally signed cross-border payment message 35) and any associated attributes carried in type SignedData. The hash is calculated using the hash algorithm, the content-to-be-signed, and any additional attributes that need to be cryptographically bound under the digital signature. Additional parameters or attributes may be specified by the intermediate financial institution 40, another financial institution on the cross-border payment chain, or the entity in charge of the end-to-end cross-border payment authentication system 10. In some arrangements, the TST is included in "attributes" of the second SignedData message. A TST is generated by sending the hash to a time stamp authority TSA, which cryptographically binds the hash to a time stamp. In some arrangements, a Security SAML assertion is included in attributes of the second SignedData message. With SignedData, there is no need to send the actual certificate along in the message; instead, an attribute or other identifier can indicate which certificate the subsequent financial institution needs in order to verify the signature. For example, an attribute could include "certificate issuer DN and certificate serial number 123" that uniquely identifies the signing certificate.

Step 242 is completed when the second digitally signed cross-border payment message 45 generated using the SignedData cryptographic message syntax is sent to the beneficiary financial institution 50.

The beneficiary financial institution's 50 method 260 of verifying the second SignedData message begins at 262 when the beneficiary financial institution 50 receives the second digitally signed cross-border payment message 45 from the intermediate financial institution 40.

At 264, the beneficiary financial institution 50 retrieves the public key of the intermediate financial institution 40 and the originating financial institution 30 to verify the digital signature of the intermediate financial institution 40 and encapsulated digital signature of the originating financial institution 30 that are in the second digitally signed cross-border message. In some arrangements, the key pair is associated with a digital certificate in a PKI or CA, allowing the beneficiary financial institution 50 (or any other entity) to look up and retrieve the public key associated with the intermediate financial institution 40 and the originating financial institution 30. In other arrangements, the beneficiary financial institution 50 could examine a public key component in the second digitally signed cross-border message 45 to verify message integrity but would be unable to get origin authenticity assurance.

At 266, the beneficiary financial institution 50 recursively verifies the outer digital signature of the intermediate financial institution 40 on the second digitally signed cross-border payment message 45 and verifies the inner digital signature of the originating financial institution 30 on the encapsulated first digitally signed cross-border payment message 35. The verification process includes the beneficiary financial institution 50 generating a cryptographic hash of the content (e.g., first digitally signed cross-border payment message) identified in the second digitally signed message. The hash is signed using the public key the intermediate financial institution 40, a signature algorithm, and any additional parameters. If signature fails, then the result will not be the same as the value carried in the second digitally signed cross-border payment message 45, and the message is not verified at 268. As will be appreciated, if the digital signature fails, then the beneficiary financial institution 50 will be able to identify the intermediate financial institution 40 as a possible location on the cross-border payment chain where the cross-border payment message was altered, either accidently or fraudulently. In some arrangements of a failed verification, the beneficiary financial institution 50 may verify the digital signature of the first digitally signed cross-border payment message 35 to determine if the altered cross-border payment message also occurred at the originating financial institution 30. If the signature is valid, then the result will be the same as the value carried in the second digitally signed cross-border payment message 45 and the encapsulated first digitally signed cross-border payment message is verified.

The recursive verification process includes the beneficiary financial institution's 40 generating a cryptographic hash of the content (e.g., cross-border payment details) identified in the first digitally signed message 35. The hash is signed using the public key of the originating financial institution 30, a signature algorithm, and any additional parameters. If the signature is valid, then the result will be the same as the value carried in the first digitally signed cross-border payment message 35 and the message is verified at 270. If signature fails, then the result will not be the same as the value carried in the first digitally signed cross-border payment message 35 and the message is not verified at 268. As will be appreciated, the beneficiary financial institution 50 will be able to identify the originating financial institution 30 as the location on the cross-border payment chain where the cross-border payment message was altered, either accidently or fraudulently.

In some arrangements, the beneficiary financial institution 50 verifies the TST included in the second digitally signed cross-border payment message 45 by completing a hash check of the information. The hash check includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA. As will be appreciated, the beneficiary financial institution 50 can verify the TST on the encapsulated first digitally signed cross-border payment message 35 by completing a similar hash check.

At 270, the digital signatures in the second digitally signed cross-border payment message 45 have been verified, and the cross-border payment has been approved by the beneficiary financial institution 50. As will be appreciated, once the digital signatures are verified, the second digitally signed cross-border payment message 45 can also be validated on a data integrity level. This is achieved by trusting all the signers of the second digitally signed cross-border payment message 45 and validating the schema used to generate both the second digitally signed cross-border payment message 45 and the encapsulated first digitally signed cross-border payment message 35. For example, the beneficiary financial institution 50 may examine and lookup OIDs contained in the second digitally signed cross-border payment message related to the financial institution name, financial institution number, etc. and determine that they are valid and in accordance with the agreed format of the end-to-end cross-border payment authentication system 10. The cross-border payment funds are deposited in the beneficiary's 60 account at the beneficiary financial institution 50.

Figure 3:
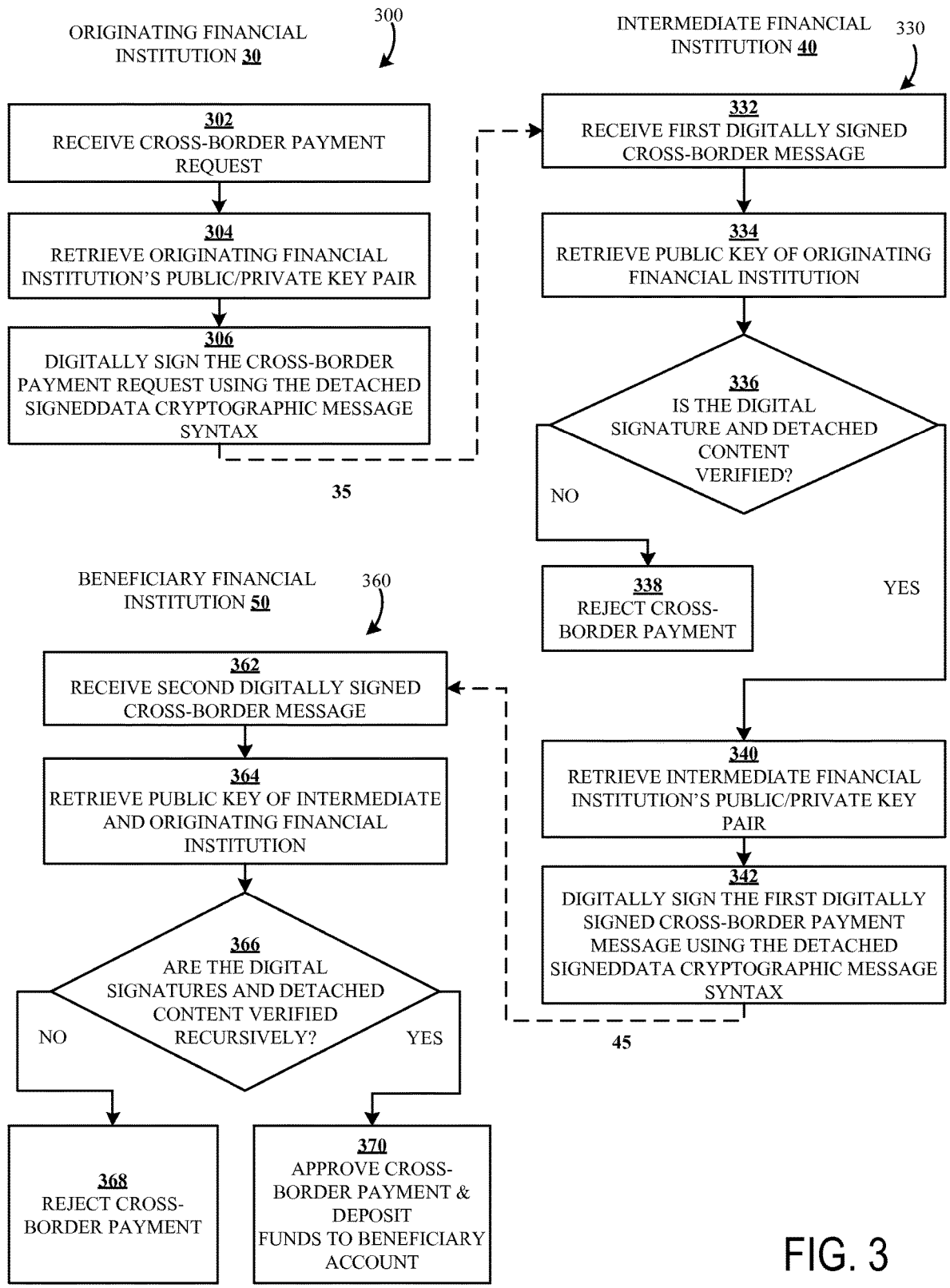
FIG. 3 is a flow diagram of a cross-border payment message using the detached SignedData schema and the end-to-end cross-border payment authentication system of FIG. 1, according to an example embodiment.

Referring to FIG. 3, a flow diagram of methods 300, 330, and 360 of digitally signing a cross-border payment message using a detached SignedData schema and the end-to-end cross-border payment authentication system 10 of FIG. 1 is shown, according to an example embodiment. FIG. 3 is shown in connection with the end-to-end cross-border payment authentication system 10 of FIG. 1. The methods 300, 330, and 360 are shown in connection with the originating financial institution 30, the intermediate financial institution 40, and the beneficiary financial institution 50, respectively.

In some arrangements, the methods, 300, 330, and 360, are performed by an external third party or by other systems and devices. The methods 300, 330, and 360 are similar to the methods 200, 230, and 260 of FIG. 2 except that the detached SignedData schema is used in the methods 300, 330, and 360 of FIG. 3.

The originating financial institution's 30 generation of a detached SignedData message method 300 begins at 302 when the originating financial institution 30 receives a cross-border payment request 25 from an originator 20. The cross-border payment request 25 includes details regarding the originator's account that will be used to facilitate the cross-border payment, the beneficiary account details, the beneficiary name, and any other details needed for the cross-border payment.

At 304, the originating financial institution 30 retrieves a public/private key pair. In some arrangements, the public/private key pair is associated with a digital certificate in a PKI, for example the X.509 certificate. In those arrangements, a key pair is generated (the private/public key pair must be generated together because they are mathematically related), the private key signs the public key, and the pair is summited to the CA or the front end registration authority that will then generate that public key certificate. Alternatively, the retrieved private/public key pair can be one issued with a commercial CA, for example one associated with the originating financial institution 30.

At 306, the originating financial institution 30 digitally signs the cross-border payment request using the private key of the originating financial institution 30 and the detached SignedData cryptographic message syntax to generate the first digitally signed cross-border payment message 35 (e.g., a first detached SignedData message). The detached SignedData cryptographic message syntax differs from the SignedData cryptographic message syntax in the use of detached content (e.g., the cross-border payment request 25). The detached content is such that the signature in the detached SignedData message is performed over the detached content content-to-be-signed, but that signed detached content is not included in the SignedData message, thereby being detached. However, the detached content must be available when the detached SignedData signature is verified because the signature verification process requires computing the hash over the content. For example, when a cross-border payment request 25 is signed, applications can convey the cross-border payment request 25 content separately from any signed attributes associated with the cross-border payment request 25. This allows an application process to operate on the cross-border payment request 25, while ignoring associated information security management attributes, and to rely on another application process (e.g., a Web service to perform signature verification). For example, a message is generated using the detached SignedData schema on the cross-border payment request 25 (e.g., the detached content); a hash of the cross-border payment request 25 is the input into the detached SignedData message schema and the plaintext cross-border payment request 25 is omitted from the detached SignedData message. Beneficially, the message will limit the disruption in the operation of the cross-border payment request 25 in the cross-border payment chain.

In some arrangements utilizing the detached SignedData message, an OID of class "attribute" can be generated to provide additional information in the detached SignedData message. For example, the OID can be a customer number, financial institution, account, or other information the signing financial institution would like to include with the cross-border payment request 25 in the first digitally signed cross-border payment message 35. In some arrangements, the TST is included in attributes of the first detached SignedData message. In some arrangements, a SAML assertion is included in attributes of the first detached SignedData message. With detached SignedData, there is no need to send the actual certificate along in the message; instead, an attribute or other identifier can indicate which certificate the subsequent financial institution needs in order to verify the signature.

Step 306 is completed when the first digitally signed cross-border payment message 35 generated using the detached SignedData cryptographic message syntax is sent to the intermediate financial institution 40. In some arrangements, the first digitally signed cross-border payment message 35 includes the detached content. In other arrangements, the detached content is transmitted separate from the first digitally signed cross-border payment message 35. In further arrangements, the detached content is stored in a repository (e.g., database, blockchain, distributed ledger, etc.) accessible by the financial institutions 30, 40, 50.

The intermediate financial institution's 40 method 330 of verifying and encapsulating the detached SignedData message begins at 332 when the intermediate financial institution 40 receives the first digitally signed cross-border payment message 35 from the originating financial institution 30.

At 334, the intermediate financial institution 40 retrieves the public key of the originating financial institution 30 and the detached content to verify the digital signature of the first digitally signed cross-border message 35. In some arrangements, the key pair is associated with a digital certificate in a PKI or CA, allowing the intermediate financial institution 40 (or any other entity) to look up and retrieve the public key associated with originating financial institution 30. In other arrangements, the intermediate financial institution 40 could examine a public key component in the first digitally signed cross-border message 35 to verify message integrity but would be unable to get origin authenticity assurance. Retrieving the detached content is dependent on the method of transmitting the detached content. In some arrangements, the first digitally signed cross-border payment message 35 includes the detached content. In other arrangements, the detached content is transmitted separate from the first digitally signed cross-border payment message 35. In further arrangements, the detached content is retrieved from a repository (e.g., database, blockchain, distributed ledger, etc.) accessible by the intermediate financial institution 40.

At 336, the intermediate financial institution 40 verifies the digital signature of the originating financial institution 30 on the first digitally signed cross-border payment message 35. The verification process includes the intermediate financial institution's 40 generating a cryptographic hash of the retrieved detached content (e.g., cross-border payment details) identified in the first digitally signed cross-border payment message 35. The generated hash is compared to the hash contained in the first digitally signed cross-border payment message 35 to determine data integrity. If they match, then the hash in the first digitally signed cross-border payment message 35 is assumed to have data integrity. To validate the digital signature, the hash is signed using the public key of the originating financial institution 30, a signature algorithm, and any additional parameters. If the signature is valid, then the result will be the same as the value carried in the first digitally signed cross-border payment message 35 and the message is verified at 340. If signature fails, then the result will not be the same as the value carried in the first digitally signed cross-border payment message 35 and the message is not verified at 338. As will be appreciated, if the digital signature fails, then the intermediate financial institution 40 will be able to identify the originating financial institution 30 as a possible location on the cross-border payment chain where the cross-border payment message was altered, either accidently or fraudulently.

In some arrangements, the intermediate financial institution 40 verifies the TST included in the first digitally signed cross-border payment message 35 by completing a hash check of the information. The hash check includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key via digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA.

At 340, if the digital signature of the originating financial institution 30 is verified, the intermediate financial institution 40 retrieves a public/private key pair. In some arrangements, the public/private key pair is associated with a digital certificate in a PKI, for example the X.509 certificate. In those arrangements, a key pair is generated (the private/public key pair must be generated together as they are mathematically related), the private key signs the public key, and the pair is summited to the CA or the front end registration authority that will then generate a public key certificate. Alternatively, the retrieved private/public key pair can be one issued with a commercial CA, for example one associated with the intermediate financial institution 40.

At 342, the intermediate financial institution 40 digitally signs the first digitally signed cross-border payment message 35 using the private key of the intermediate financial institution 40 and the detached SignedData cryptographic message syntax to generate a second digitally signed cross-border payment message 45 (e.g., a second detached SignedData message that encapsulates the first digitally signed cross-border payment message 35). In some arrangements, the detached content includes the first digitally signed cross-border payment message 35. In other arrangements, it includes only the cross-border payment request 25. The second detached SignedData message is generated by using the detached SignedData schema on the first digitally signed cross-border payment message 35 (e.g., the detached content), where a hash of the first digitally signed cross-border payment message 35 is the input into the detached SignedData message schema and the plaintext first digitally signed cross-border payment message 35 is omitted from the detached SignedData message in order to limit the disruption in the operation of the first digitally signed cross-border payment message 35 in the cross-border payment chain.

Step 342 is completed when the second digitally signed cross-border payment message generated using the detached SignedData cryptographic message syntax is sent to the beneficiary financial institution 50.

The beneficiary financial institution's 50 method 360 of verifying the second detached SignedData message begins at 362 when the beneficiary financial institution 50 receives the second digitally signed cross-border payment message 45 from the intermediate financial institution 40.

At 364, the beneficiary financial institution 50 retrieves the public key of the intermediate financial institution 40 and the originating financial institution 30 and the detached content to verify the digital signature of the intermediate financial institution 40 and encapsulated digital signature of the originating financial institution 30 that are in the second digitally signed cross-border message 45. In some arrangements, the key pair is associated with a digital certificate in a PKI or CA, allowing the beneficiary financial institution 50 (or any other entity) to look up and retrieve the public key associated with the intermediate financial institution 40 and the originating financial institution 30. In other arrangements, the beneficiary financial institution 50 could examine a public key component in the second digitally signed cross-border message 45 to verify message integrity but would be unable to get origin authenticity assurance. Retrieving the detached content is dependent on the method of transmitting the detached content. In some arrangements, the first digitally signed cross-border payment message 35 includes the detached content. In other arrangements, the detached content is transmitted separate from the first digitally signed cross-border payment message 35. In further arrangements, the detached content is retrieved from a repository (e.g., database, blockchain, distributed ledger, etc.) accessible by the intermediate financial institution 40.

At 366, the beneficiary financial institution 50 recursively verifies the outer digital signature of the intermediate financial institution 40 on the second digitally signed cross-border payment message 45 and verifies the inner digital signature of the originating financial institution 30 on the encapsulated first digitally signed cross-border payment message 35. The verification process includes the beneficiary financial institution 50 generating a cryptographic hash of the retrieved detached content (e.g., cross-border payment details) identified in the first digitally signed message. The generated hash is compared to the hash contained in the second digitally signed cross-border payment message 45 to determine data integrity. If they match, then the hash in the second digitally signed cross-border payment message 45 is assumed to have data integrity. To validate the digital signature, the hash is signed using the public key of the intermediate financial institution 40, a signature algorithm, and any additional parameters. If signature fails, then the result will not be the same as the value carried in the second digitally signed cross-border payment message 45, and the message is not verified at 368. As will be appreciated, if the digital signature fails, then the beneficiary financial institution 50 will be able to identify the intermediate financial institution 40 as a possible location on the cross-border payment chain where the cross-border payment message was altered, either accidently or fraudulently. In some arrangements of a failed verification, the beneficiary financial institution 50 may verify the digital signature of the first digitally signed cross-border payment message 35 to determine if the altered cross-border payment message also occurred at the originating financial institution 30If the signature is valid, then the result will be the same as the value carried in the second digitally signed cross-border payment message 45 and the encapsulated first digitally signed cross-border payment message is verified.

The recursive verification process includes the beneficiary financial institution 40 generating a cryptographic hash of the detached content (e.g., cross-border payment details) identified in the first digitally signed message 35. The generated hash is compared to the hash in the first digitally signed cross-border payment message 35 to verify data authenticity. The encapsulated digital signature is verified by signing the hash using the public key of the originating financial institution 30, a signature algorithm, and any additional parameters. If the signature is valid, then the result will be the same as the value carried in the first digitally signed cross-border payment message 35, and the message is verified at 370. If signature fails, then the result will not be the same as the value carried in the first digitally signed cross-border payment message 35 and the message is not verified at 368. As will be appreciated, the beneficiary financial institution 50 will be able to identify the originating financial institution 30 as the location on the cross-border payment chain where the cross-border payment message was altered, either accidently or fraudulently.

In some arrangements, the beneficiary financial institution 50 verifies the TST included in the second digitally signed cross-border payment message 45 by completing a hash check with the information. The hash check includes generating a hash of the original data, appending the timestamp given by the TSA, and calculating the hash of the result (e.g., the hash of the original data with the appended time stamp). The digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA. As will be appreciated, the beneficiary financial institution 50 can verify the TST on the encapsulated first digitally signed cross-border payment message 35 by completing a similar hash check.

At 370, the digital signatures in the second digitally signed cross-border payment message 45 have been verified, and the cross-border payment has been approved by the beneficiary financial institution 50. As will be appreciated, once the digital signatures are verified, the second digitally signed cross-border payment message 45 can also be validated for data integrity. This is achieved by trusting all the signers of the second digitally signed cross-border payment message 45 and validating the schema used to generate both the second digitally signed cross-border payment message 45 and the encapsulated first digitally signed cross-border payment message 35. For example, the beneficiary financial institution 50 may examine and lookup OIDs contained in the second digitally signed cross-border payment message related to the financial institution name, financial institution number, etc. and determine that they are valid and in accordance with the agreed format of the end-to-end cross-border payment authentication system 10. The cross-border payment funds are deposited in the beneficiary's 60 account at the beneficiary financial institution 50.

Figure 4:
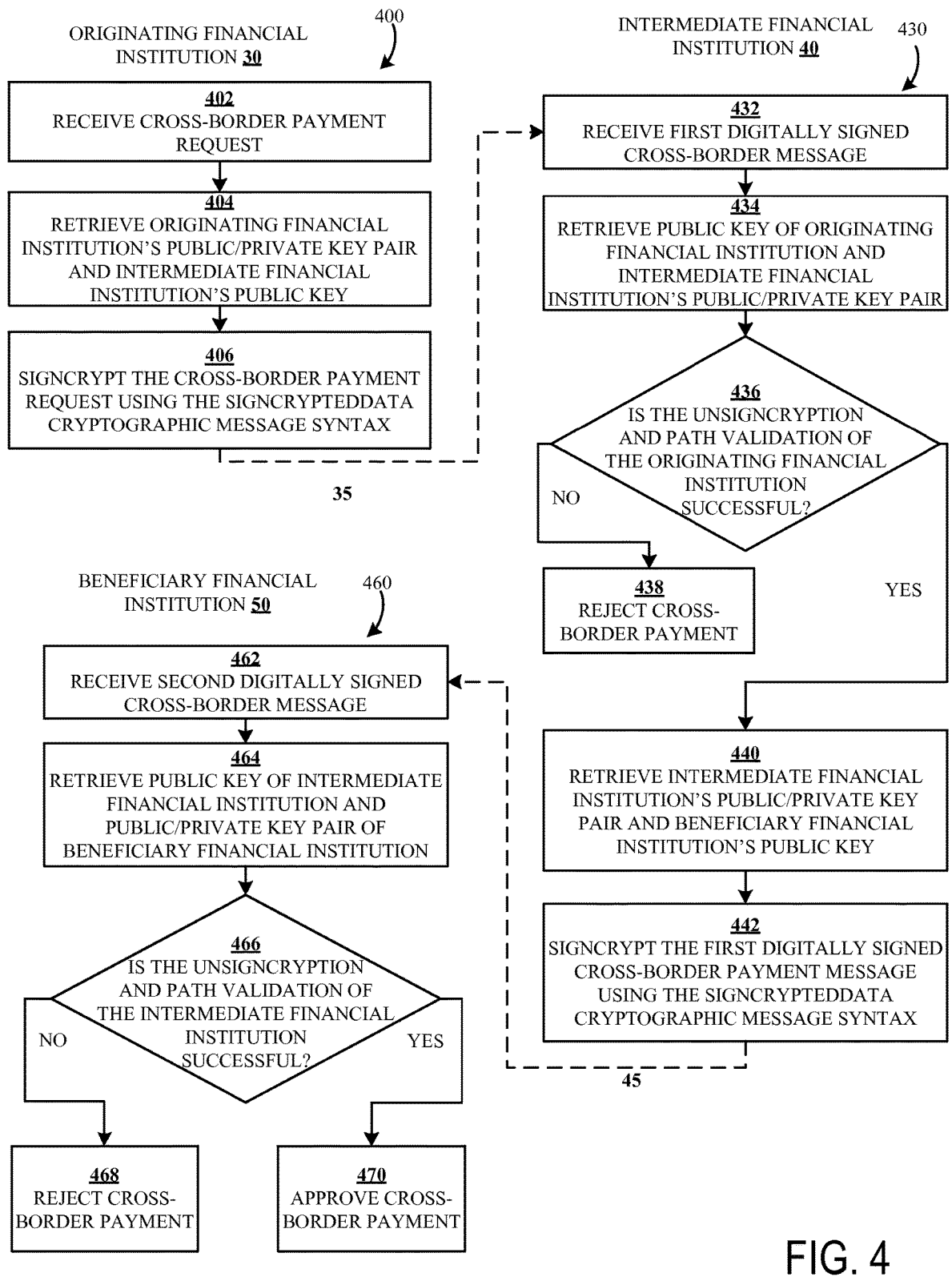
FIG. 4 is a flow diagram of a cross-border payment message using the SigncryptedData schema and the end-to-end cross-border payment authentication system of FIG. 1, according to an example embodiment.

Referring to FIG. 4, a flow diagram of methods 400, 440, and 460 of digitally signing a cross-border payment message using a SigncryptedData message schema and the end-to-end cross-border payment authentication system 10 of FIG. 1 is shown, according to an example embodiment. FIG. 4 is shown in connection with the end-to-end cross-border payment authentication system 10 of FIG. 1. The methods 400, 440, and 460, are shown in connection with the originating financial institution 30, the intermediate financial institution 40, and the beneficiary financial institution 50, respectively. In some arrangements, the methods, 400, 440 and 460, are performed by an external third party or by other systems and devices. The methods 400, 430, and 460 are similar to the methods 200, 230, and 260 of FIG. 2 or the methods 300, 330, 360 of FIG. 3 except that the SigncryptedData message schema is used in the methods 400, 430, and 460 of FIG. 4. As will be appreciated, the use of the SigncryptedData message schema provides enhanced confidentiality to the cross-border payment process by way of encryption at the expense full cross-border payment chain transparency as only the receiving financial institution at each point can unsigncrypt the SigncryptedData message and recover the message.

The originating financial institution's 40 generation of a SigncryptedData message method 400 begins at 402 when the originating financial institution 30 receives a cross-border payment request 25 from an originator 40. The cross-border payment request 25 includes details regarding the originator's account that will be used to facilitate the cross-border payment, the beneficiary account details, the beneficiary name, and any other details needed for the cross-border payment.

At 404, the originating financial institution 30 retrieves the public/private key pair of the originating financial institution 30 and the public key of the intermediate financial institution 40. In some arrangements, the public/private key pair and public key are associated with a digital certificate in a PKI, for example the X.509 certificate. In those arrangements, a key pair is generated (the private/public key pair must be generated together because they are mathematically related), the private key signs the public key, and the pair is summited to the CA or the front end registration authority that will then generate that public key certificate. Alternatively, the retrieved private/public key pair can be one issued with a commercial CA, for example one associated with the originating financial institution 30.

At 406, the originating financial institution 30 signcrypts (e.g., digitally signs and encrypts) the cross-border payment request using the public/private key of the originating financial institution 30, public key of the intermediate financial institution 40, and the SigncryptedData cryptographic message syntax to generate the first digitally signed cross-border payment message 35 (e.g., a first SigncryptedData message). The SigncryptedData cryptographic message syntax differs from the SignedData cryptographic message syntax in the use of both of the signing financial institution's keys and the receiving financial institution's public key, instead of just the signing party private key. The SigncryptedData message is generated using a signcryption algorithm associated with the SigncryptedData message schema. The input for the signcryption algorithm of the signcrypted envelope message includes: plaintext content (including at least the cross-border payment request 25), the public and private key pair of the originating financial institution 30, and the public key of the intermediate financial institution 40. The plaintext and resulting first SigncryptedData message (e.g., first digitally signed cross-border payment message 35) are all bit strings. In some arrangements, the input also includes a label and an option. While the plaintext, label, and resulting SigncryptedData message are all bit strings, the public and private keys and the option are determined by the particular implementation of an SigncryptedData message schema (e.g., SigncryptedData-content, SigncryptedData-attributes, and SigncryptedData-components modes).

Expanding on the different implementations of SigncryptedData message schema, in the SigncryptedData-content mode, data content of any type is signcrypted. In the SigncryptedData-attributes mode, data content and associated attributes of any type or format are signcrypted. In the SigncryptedData-components mode, components of the data content of any type are signcrypted, and then the resulting content is signed along with a set of associated attributes.

This mode allows a cross-border payment message containing signcrypted components to be cryptographically bound together with a set of security attributes using a digital signature. With any of the implementations, a list of signcrypted components can be carried in a signed attribute. The format and the information contained in the list varies with the type of content. XML Path ("XPath") expressions can be used to locate any signcrypted element in any XML-instance document.

In some arrangements utilizing the SigncryptedData message, an OID of class "attribute" can be generated to provide additional information in the SigncryptedData message. For example, the OID can be a customer number, financial institution, account, and other information the signing financial institution would like to include with the cross-border payment request 25 in the first digitally signed cross-border payment message 35. In some arrangements, the TST is included in attributes of the first SigncryptedData message. In some arrangements, a SAML assertion is included in attributes of the first SigncryptedData message. With SigncryptedData, there is no need to send the actual certificate along in the message; instead an attribute or other identifier can indicate which certificate the subsequent financial institution needs in order to verify the signature.

Step 406 is completed when the first digitally signed cross-border payment message 35 generated using the SigncryptedData cryptographic message syntax is sent to the intermediate financial institution 40.

The intermediate financial institution's 40 method 430 of unsigncryption and encapsulating the SigncryptedData message begins at 442 when the intermediate financial institution 40 receives the first digitally signed cross-border payment message 35 from the originating financial institution 30.

At 434, the intermediate financial institution 40 retrieves the public key of the originating financial institution 30 and the public/private key pair of the intermediate financial institution 40.

At 436, the intermediate financial institution 40 unsigncrypts the first digitally signed cross-border payment message 35 using the public key of the originating financial institution 30 and the public/private key pair of the intermediate financial institution 40. In some arrangements, the intermediate financial institution 40 accomplishes this using a unsigncryption algorithm with the inputs of: the first digitally signed cross-border payment message 35, the public/private key pair of the intermediate financial institution 40, and the public key of the originating financial institution 30. If the unsigncryption is valid, then the method 430 continues to 440. In some arrangements, the resulting output of a valid unsigncryption includes a pair consisting of either a symbolic value "ACCEPT" and plaintext (e.g., unencrypted) of the cross-border payment message and the hash of the cipher text. If the unsigncryption is invalid at 438, then the intermediate financial institution 40 can reject the first digitally signed cross-border payment message 35. In some arrangements, the resulting output of an invalid unsigncryption is a symbolic value "REJECT" and the null string indicating an unsuccessful unsigncryption.

In some arrangements, a certificate path validation can be performed on the public key of the originating financial institution 30 to gain assurance that the originating financial institution's 30 public key certificate is trusted. In one arrangement, path validation is performed on the originating financial institution 30 certificate chain back to a trust anchor, for example, to determine if the certificates in the path are not on a revocation list. In some arrangements, the first digitally signed cross-border payment message 35 includes PKI, CRLs, CA, or similar information for the intermediate financial institution 40 to track the signature back to a trust anchor/entity. For example, the intermediate financial institution 40 verifies with the public or private service provider associated with the key pair used that the public key certificate is valid. In other arrangements, the intermediate financial institution 40 can attempt to verify the signed version of the hash that the intermediate financial institution 40 has received from the originating financial institution 30 by using the public key of the originating financial institution 30. The verification procedure uses the public key of the originating financial institution 30 in a mathematical operation to determine whether the signature was indeed created from the same hash using the correct private key. If the verification function is successful, then the signed version of the hash will be proven to have originated from the hash that the intermediate financial institution 40 has produced by applying the hash function directly to the message. A successful verification operation therefore allows the intermediate financial institution 40 to confirm the true authorship of the message and to confirm that the message has not been altered.

At 440, the intermediate financial institution 40 retrieves the public/private key pair of the intermediate financial institution 40 and the public key of the beneficiary financial institution 50. In some arrangements, the public/private key pair and public key are associated with a digital certificate in a PKI, for example the X.509 certificate. In those arrangements, a key pair is generated (the private/public key pair must be generated together as they are mathematically related), the private key signs the public key, and the pair is summited to the CA or the front end registration authority that will then generate that public key certificate. Alternatively, the retrieved private/public key pair can be one issued with a commercial CA.

At 442, the intermediate financial institution 40 signcrypts (e.g., digitally sign and encrypt) the cross-border payment request (retrieved from unsigncrypting the first digitally signed cross-border payment message 35) using the public/private key of the intermediate financial institution 40, public key of the beneficiary financial institution 50 and the SigncryptedData cryptographic message syntax to generate the second digitally signed cross-border payment message 45 (e.g., a second SigncryptedData message). The SigncryptedData message is generated using a signcryption algorithm associated with the SigncryptedData message schema. The input for the signcryption algorithm of the signcrypted envelope message includes: plaintext content (including at least the unsigncrypted first cross-border payment message 35), the public and private key pair of the intermediate financial institution 40, and the public key of the beneficiary financial institution 50. The plaintext and resulting second SigncryptedData message (e.g., second digitally signed cross-border payment message 45) are all bit strings. As will be appreciated, the second digitally signed cross-border message 45 does not encapsulate a signcrypted first digitally signed cross-border message because a subsequent financial institution would be unable unsigncrypt the signcrypted first digitally signed cross-border message due to a lack of the public/private key pair of the previous financial institution. In some arrangements, the input also includes a label and an option. While the plaintext, label, and resulting SigncryptedData message are all bit strings, the public and private keys and the option are determined by the particular implementation of an SigncryptedData message schema (e.g., SigncryptedData-content, SigncryptedData-attributes, and SigncryptedData-components modes).

Step 442 is completed when the second digitally signed cross-border payment message 45 generated using the SigncryptedData cryptographic message syntax is sent to the beneficiary financial institution 50.

The beneficiary financial institution's 50 method 460 of verifying the second SigncryptedData message begins at 462 when the beneficiary financial institution 50 receives the second digitally signed cross-border payment message 45 from the intermediate financial institution 40.

At 464, the beneficiary financial institution 50 retrieves the public key of the intermediate financial institution 40 and the public/private key pair of the beneficiary financial institution 50.

At 466, the beneficiary financial institution 50 unsigncrypts the second digitally signed cross-border payment message 45 using the public key of the intermediate financial institution 40 and the public/private key pair of the beneficiary financial institution 50. In some arrangements, the beneficiary financial institution 50 accomplishes this by using a unsigncryption algorithm with the inputs of: the second digitally signed cross-border payment message 45, the public/private key pair of the beneficiary financial institution 50, and the public key of the intermediate financial institution 40. If the unsigncryption is valid at 470, then the beneficiary financial institution 50 can accept the second digitally signed cross-border payment message 45. In some arrangements, the resulting output of a valid unsigncryption includes a pair consisting of either a symbolic value "ACCEPT" and plaintext (e.g., unencrypted) of the cross-border payment message and the hash of the cipher text. If the unsigncryption is invalid at 468, then the beneficiary financial institution 50 can reject the second digitally signed cross-border payment message 45. In some arrangements, the resulting output of an invalid unsigncryption is a symbolic value "REJECT" and the null string indicating an unsuccessful unsigncryption. As will be appreciated there is no recursive descent into other digital signatures in the second digitally signed cross-border payment message 45 because each financial institution can only unsigncrypt the previous financial institutions digitally signed cross-border payment message.

In some arrangements, a certificate path validation can be performed on the public key of the intermediate financial institution 40 to gain assurance that the intermediate financial institution's 30 public key certificate is trusted. This step can be similar to step 436 of the method 430.

At 470, the digital signatures in the second digitally signed cross-border payment message have been verified, and the cross-border payment has been approved by the beneficiary financial institution 50. The cross-border payment funds are deposited in the beneficiary's 60 account at the beneficiary financial institution 50.

Figure 5:
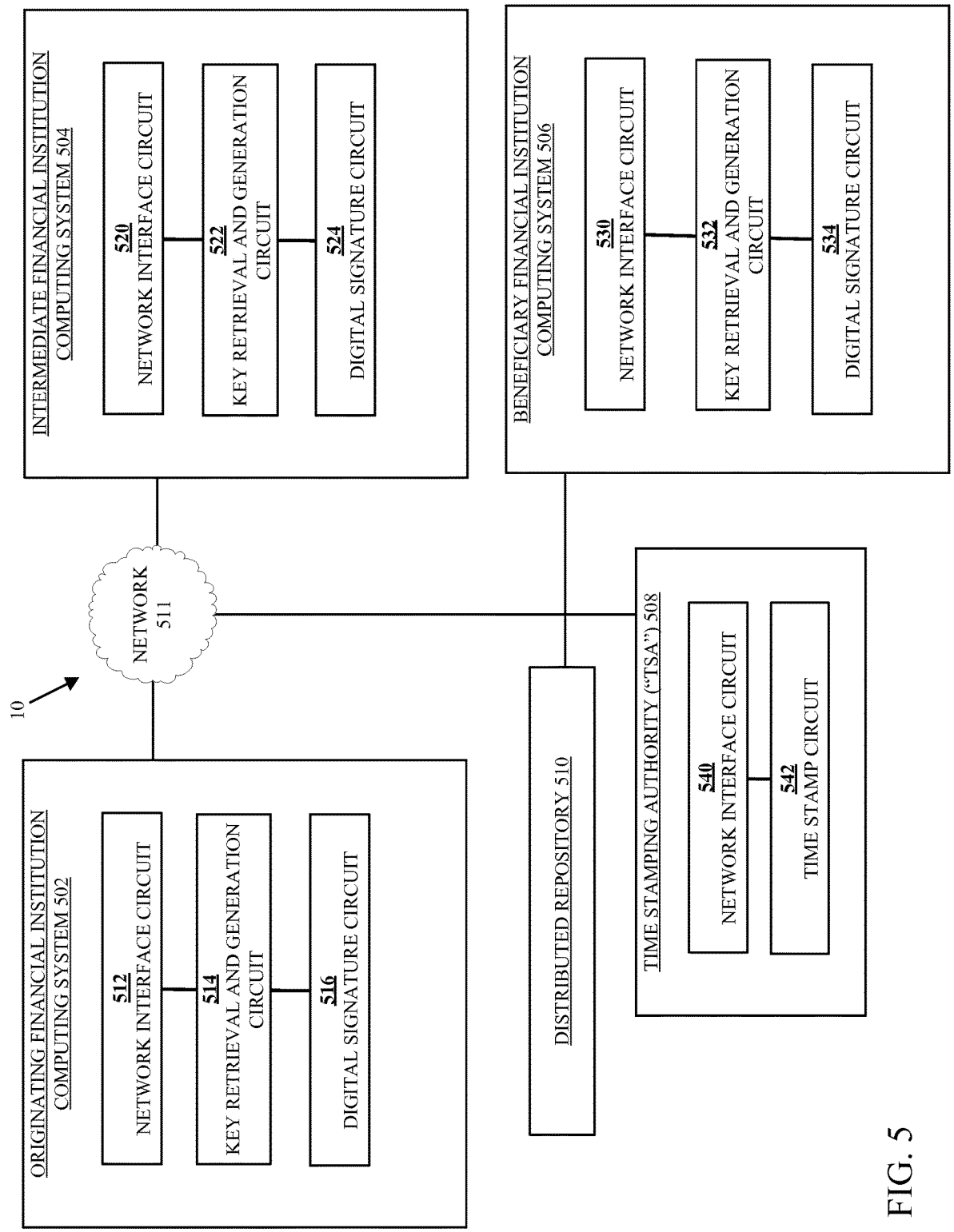
FIG. 5 is a schematic diagram of an end-to-end cross-border payment authentication system, according to an example embodiment.

FIG. 5 is a schematic diagram of the end-to-end cross-border payment authentication system 10, according to an example embodiment. The end-to-end cross-border payment authentication system 10 includes an originating financial institution computing system 502, an intermediate financial institution computing system 504, beneficiary financial institution computing system 506, a TSA computing system 508, and a distributed repository 510. Each of the originating financial institution computing system 502, intermediate financial institution computing system 504, beneficiary financial institution computing system 506, TSA computing system, and distributed repository 510 is in operative communication with the others via a network 511. The originating financial institution computing system 502 may be operated by the originating financial institution 30 of FIG. 1. The intermediate financial institution computing system 504 may be operated by the intermediate financial institution 40 of FIG. 1. The beneficiary financial institution computing system 506 may be operated by the beneficiary financial institution 50 of FIG. 1. Generally, the end-to-end cross-border payment authentication system 10 is structured so each successive step in the cross-border payment chain wraps another digital signature around the previous cross-border payment message (e.g., identifiers and data of the cross-border payment).

The originating financial institution computing system 502 includes a network interface 512, a key retrieval and generation circuit 514, and a digital signature circuit 516. While the originating financial institution computing system 502 is described as receiving the cross-border payment request 25 from an originator 20, the originating financial institution computing system 502 is structured to operate at any location on the cross-border payment chain. In other words, the originating financial institution computing system 502 is structured similarly to the intermediate financial institution computing system 504 and the beneficiary financial institution computing system 506, and vice versa. The network interface circuit 512 is structured to facilitate operative communication between the originating financial institution computing system 502 and other systems and devices over the network 511.

The key retrieval and generation circuit 514 is structured to generate or retrieve a public/private key pair for the digital signature (and in the case of SigncryptedData encryption) of the cross-border payment message. In some embodiments the public/private key pair is associated with a digital certificate in a PKI, for example the X.509 certificate. In those embodiments, a key pair is generated (the private/public key pair must be generated together as they are mathematically related), the private key signs the public key, and the pair is summited to the CA or the front end registration authority that will then generate that public key certificate. Alternatively, the private/public key pair could be issued with a commercial CA, for example one associated with a financial institution or using an internally generated self-signed certificate. In some arrangements, the originating financial institution computing system 502 retrieves a public key certificate from the commercial CA and uses the certificate to ascertain the public/private key pair. In other embodiments, the key retrieval and generation circuit 514 generates an ephemeral public/private key pair not associated with a digital certificate in a PKI. In some arrangements using the SigncryptedData message schema, the public key of the next financial institution on the cross-border payment chain is retrieved.

The digital signature circuit 516 is structured to digitally sign (and, in the case of SigncryptedData, also encrypt) the cross-border payment message and verify the digital signature in a received cross-border payment message. The digital signature circuit 516 is structured to verify and sign a cross-border payment message using the SignedData, detached SignedData, and SigncryptedData message schema, each of which provides unique functionality. The verification of the digital signature is described in greater detail above in the methods 230, 260, 330, 360, 430, 460 of FIGS. 2, 3, and 4, respectively. The generation of the digital signature is described in greater detail above in the methods 200, 200, 300, 330, 400, 430 of FIGS. 2, 3, and 4, respectively.

The intermediate financial institution computing system 504 includes a network interface 520, a key retrieval and generation circuit 522, and a digital signature circuit 524. While the intermediate financial institution computing system 504 is described as receiving the first digitally signed cross-border payment message 35 from the originating financial institution 30, the intermediate financial institution computing system 504 is structured to operate at any location on the cross-border payment chain. In other words, the intermediate financial institution computing system 504 is structured similarly to the originating financial institution computing system 502 and the beneficiary financial institution computing system 506, and vice versa. The network interface circuit 520 is structured to facilitate operative communication between the intermediate financial institution computing system 504 and other systems and devices over the network 511.

The key retrieval and generation circuit 522 is structured to generate or retrieve a public/private key pair for the digital signature (and, in the case of SigncryptedData, encryption) of the cross-border payment message. In some embodiments the public/private key pair is associated with a digital certificate in a PKI, for example the X.509 certificate. In those embodiments, a key pair is generated (the private/public key pair must be generated together as they are mathematically related), the private key signs the public key, and the pair is summited to the CA or the front end registration authority that will then generate that public key certificate. Alternatively, the private/public key pair could be issued with a commercial CA, for example one associated with a financial institution or using an internally generated self-signed certificate. In some arrangements, the intermediate financial institution computing system 504 retrieves a public key certificate from the commercial CA and uses the certificate to ascertain the public/private key pair. In other embodiments, the key retrieval and generation circuit 522 generates an ephemeral public/private key pair not associated with a digital certificate in a PKI. In some arrangements using the SigncryptedData message schema, the public key of the next financial institution on the cross-border payment chain is retrieved.

The digital signature circuit 524 is structured to digitally sign (and, in the case of SigncryptedData, also encrypt) the cross-border payment message and verify the digital signature in a received cross-border payment message. The digital signature circuit 524 is structured to verify and sign a cross-border payment message using the SignedData, detached SignedData, and SigncryptedData message schema, each of which provides unique functionality. The verification of the digital signature is described in greater detail above in the methods 230, 260, 330, 360, 430, 460 of FIGS. 2, 3, and 4, respectively. The generation of the digital signature is described in greater detail above in the methods 200, 200, 300, 330, 400, 430 of FIGS. 2, 3, and 4, respectively.

The beneficiary financial institution computing system 506 includes a network interface 530, a key retrieval and generation circuit 532, and a digital signature circuit 534. While the beneficiary financial institution computing system 506 is described as receiving the second digitally signed cross-border payment message 45 from the intermediate financial institution 40, the beneficiary financial institution computing system 506 is structured to operate at any location on the cross-border payment chain. In other words, the beneficiary financial institution computing system 506 is structured similarly to the originating financial institution computing system 502 and the intermediate financial institution computing system 504, and vice versa. The network interface circuit 530 is structured to facilitate operative communication between the beneficiary financial institution computing system 506 and other systems and devices over the network 511.

The key retrieval and generation circuit 532 is structured to generate or retrieve a public/private key pair for the digital signature (and, in the case of SigncryptedData, encryption) of the cross-border payment message. In some embodiments, the public/private key pair is associated with a digital certificate in a PKI, for example the X.509 certificate. In those embodiments, a key pair is generated (the private/public key pair must be generated together because they are mathematically related), the private key signs the public key, and the pair is summited to the CA or the front end registration authority that will then generate that public key certificate. Alternatively, the private/public key pair could be issued with a commercial CA, for example one associated with a financial institution or using an internally generated self-signed certificate. In some arrangements, the intermediate financial institution computing system 504 retrieves a public key certificate from the commercial CA and uses the certificate to ascertain the public/private key pair. In other embodiments, the key retrieval and generation circuit 522 generates an ephemeral public/private key pair not associated with a digital certificate in a PKI. In some arrangements using the SigncryptedData message schema, the public key of the next financial institution on the cross-border payment chain is retrieved.

The digital signature circuit 534 is structured to digitally sign (and, in the case of SigncryptedData, also encrypt) the cross-border payment message and verify the digital signature in a received cross-border payment message. The digital signature circuit 524 is structured to verify and sign a cross-border payment message using the SignedData, detached SignedData, and SigncryptedData message schema, each of which provides unique functionality. The verification of the digital signature is described in greater detail above in the methods 230, 260, 330, 360, 430, 460 of FIGS. 2, 3, and 4, respectively. The generation of the digital signature is described in greater detail above in the methods 200, 200, 300, 330, 400, 430 of FIGS. 2, 3, and 4, respectively.

The TSA computing system 508 includes a network interface circuit 540 and a time stamp circuit 542. The TSA computing system 508 is managed by any trusted time authority that can provide a TST for a piece of information or data entry. The trusted time authority can be one that complies with the X9.95 standard, or those defined in similar standards by ISO/IEC, and satisfies legal and regulatory requirements. In some embodiments, the TSA computing system 508 may be contained in, and controlled by, the TSA computing system 508 or any one of the financial institution computing system 502, 504, 506. The network interface circuit 540 is structured to facilitate operative communication between the TSA computing system 508 and any one of the financial institution computing system 502, 504, 506 over the network 511. The time stamp circuit 542 is structured to negotiate a trusted TST, which includes receiving a hash of a piece of information and generating a trusted TST for the information for future verification.

The distributed repository 510 is structured to store information, content, keys, etc. that are needed to shared amongst the financial institution's in the end-to-end cross-border payment authentication system 10. In some arrangements, the distributed repository 510 stores the detached content for subsequent financial institutions to retrieve. In some arrangements, the distributed repository 510 stores an event entry generated by a financial institution in the end-to-end cross-border payment authentication system 10. The event journal entry can capture a verification process result of a digital signature, the generation or encapsulation of a cross-border payment message, or other information. In some arrangements, the distributed repository 510 is a private blockchain.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits ("IC"), discrete circuits, system on a chip ("SOCs") circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor that, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits ("ASICs"), field programmable gate arrays ("FPGAs"), digital signal processors ("DSPs"), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data that cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed:

1. A method, comprising:
    receiving, by a computing system, a first signcrypted cross-border payment message generated by signcrypting a cross-border payment message comprising originator account details and beneficiary account details;
    retrieving, by the computing system, a first financial institution public key, a second financial institution public key, and a second financial institution private key, wherein the second financial institution public key and the second financial institution private key are part of a public/private key pair;
    unsigncrypting, by the computing system, the first signcrypted cross-border payment message using the first financial institution public key, the second financial institution public key, and the second financial institution private key to retrieve the cross-border payment message;
    determining, by the computing system based on at least one of associated attributes of the cross-border payment message, which digital certificate is needed to verify that the first financial institution public key is associated with a first financial institution;
    verifying, by the computing system based on the determined digital certificate, that the first financial institution public key is associated with the first financial institution;
    retrieving, by the computing system, the second financial institution private key, the second financial institution public key, and a third financial institution public key;
    signcrypting, by the computing system, the cross-border payment message using the second financial institution private key, the second financial institution public key, and the third financial institution public key to generate a second signcrypted cross-border payment message; and
    generating, by the computing system, a signcrypting event journal entry, the signcrypting event journal entry comprising a second digitally signed cross-border payment message and a trusted time stamp, the second digitally signed cross-border payment message does not encapsulate the first signcrypted cross-border payment message.

2. The method of claim 1, wherein one or more of the associated attributes comprises at least one of:
    fees or charges associated with a cross-border payment;
    a list of signcrypted components;
    an object identifier comprising at least one of a customer number, a financial institution, or an account;
    a time stamp token; or
    a security assertion markup language assertion.

3. The method of claim 1, wherein verifying that the first financial institution public key is associated with the first financial institution comprises:
    validating, by the computing system, a certificate of the first financial institution public key back to a trust anchor.

4. The method of claim 1, wherein the first financial institution public key is associated with a certificate validation associated with the first financial institution.

5. The method of claim 1, further comprising:
    generating, by the computing system, a signcrypting verification event journal entry, the signcrypting verification event journal entry including information related to at least one of the first financial institution public key, the second financial institution public key, the cross-border payment message, or result of the unsigncryption.

6. A financial institution computing system comprising:
    a memory; and
    a processor configured to:
        receive a first signcrypted cross-border payment message generated by signcrypting a cross-border payment message comprising originator account details and beneficiary account details,
        retrieve a first financial institution public key, a second financial institution public key, and a second financial institution private key, wherein the second financial institution public key and the second financial institution private key are part of a public/private key pair,
        unsigncrypt the first signcrypted cross-border payment message using the first financial institution public key, the second financial institution public key, and the second financial institution private key to retrieve the cross-border payment message,
        determine, based on at least one of associated attributes of the cross-border payment message, which digital certificate is needed to verify that the first financial institution public key is associated with a first financial institution,
        verify, based on the determined digital certificate, that the first financial institution public key is associated with the first financial institution,
        retrieve the second financial institution private key, the second financial institution public key, and a third financial institution public key,
        signcrypt the cross-border payment message using the second financial institution private key, the second financial institution public key, and the third financial institution public key to generate a second signcrypted cross-border payment message, and
        generate a signcrypting event journal entry, the signcrypting event journal entry comprising a second digitally signed cross-border payment message and a trusted time stamp, the second digitally signed cross-border payment message does not encapsulate the first signcrypted cross-border payment message.

7. The financial institution computing system of claim 6, wherein one or more of the associated attributes comprises at least one of:
- fees or charges associated with a cross-border payment;
- a list of signcrypted components;
- an object identifier comprising at least one of a customer number, a financial institution, or an account;
- a time stamp token; or
- a security assertion markup language assertion.

8. The financial institution computing system of claim 6, wherein verifying that the first financial institution public key is associated with the first financial institution comprises:
- validating a certificate of the first financial institution public key back to a trust anchor.

9. The financial institution computing system of claim 6, wherein the first financial institution public key is associated with a certificate validation associated with the first financial institution.

10. The financial institution computing system of claim 6, wherein the processor is further configured to:
- generate a signcrypting verification event journal entry, the signcrypting verification event journal entry including information related to at least one of the first financial institution public key, the second financial institution public key, the cross-border payment message, or result of the unsigncryption.

11. One or more non-transitory computer-readable storage media having instructions stored thereon that, when executed by at least one processing circuit, cause the at least one processing circuit to:
- receive a first signcrypted cross-border payment message generated by signcrypting a cross-border payment message comprising originator account details and beneficiary account details;
- retrieve a first financial institution public key, a second financial institution public key, and a second financial institution private key, wherein the second financial institution public key and the second financial institution private key are part of a public/private key pair;
- unsigncrypt the first signcrypted cross-border payment message using the first financial institution public key, the second financial institution public key, and the second financial institution private key to retrieve the cross-border payment message;
- determine, based on at least one of associated attributes of the cross-border payment message, which digital certificate is needed to verify that the first financial institution public key is associated with a first financial institution;
- verify, based on the determined digital certificate, that the first financial institution public key is associated with the first financial institution;
- retrieve the second financial institution private key, the second financial institution public key, and a third financial institution public key;
- signcrypt the cross-border payment message using the second financial institution private key, the second financial institution public key, and the third financial institution public key to generate a second signcrypted cross-border payment message; and
- generate a signcrypting event journal entry, the signcrypting event journal entry comprising a second digitally signed cross-border payment message and a trusted time stamp, the second digitally signed cross-border payment message does not encapsulate the first signcrypted cross-border payment message.

\* \* \* \* \*